(12) United States Patent
Rozman et al.

(10) Patent No.: US 9,705,440 B2
(45) Date of Patent: Jul. 11, 2017

(54) FAULT TOLERANT ELECTRIC POWER GENERATING SYSTEM

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/801,164

(22) Filed: Jul. 16, 2015

(65) Prior Publication Data

US 2017/0019047 A1    Jan. 19, 2017

(51) Int. Cl.
*H02P 9/00*     (2006.01)
*H02P 9/48*     (2006.01)
*H02P 11/00*   (2006.01)

(52) U.S. Cl.
CPC ..................... *H02P 9/48* (2013.01)

(58) Field of Classification Search
USPC ............................ 322/25, 27, 46, 90; 290/44
See application file for complete search history.

(56) References Cited

U.S. PATENT DOCUMENTS

| | | | | |
|---|---|---|---|---|
| 5,083,039 A | * | 1/1992 | Richardson | F03D 7/0272 290/44 |
| 5,225,712 A | * | 7/1993 | Erdman | F03D 7/0272 290/44 |
| 5,798,631 A | * | 8/1998 | Spee | F03D 7/0272 290/31 |
| 6,486,639 B1 | * | 11/2002 | Montret | H02P 9/007 322/22 |
| 6,853,094 B2 | * | 2/2005 | Feddersen | F03D 7/0224 290/44 |
| 6,856,040 B2 | * | 2/2005 | Feddersen | F03D 7/0224 290/44 |
| 6,856,041 B2 | * | 2/2005 | Siebenthaler | F03D 7/0224 290/44 |
| 6,933,625 B2 | * | 8/2005 | Feddersen | F03D 7/0224 290/44 |
| 7,102,247 B2 | * | 9/2006 | Feddersen | F03D 9/003 290/44 |
| 7,170,261 B2 | * | 1/2007 | Walter | H02M 5/22 320/123 |

(Continued)

*Primary Examiner* — Pedro J Cuevas
(74) *Attorney, Agent, or Firm* — Cantor Colburn LLP

(57) ABSTRACT

An electrical power generating system comprises a first permanent magnetic generator (PMG) stator winding of a generator machine, a first active rectifier communicatively connected to the first PMG stator winding, the first active rectifier operative to receive alternating current (AC) from the first PMG stator winding and convert the AC to direct current (DC), a direct current link communicatively connected to the first active rectifier, wherein the first active rectifier is operative to output the DC to the direct current link, a second PMG stator winding of the generator machine, and a second active rectifier communicatively connected to the second PMG stator winding, the second active rectifier operative to receive AC from the second PMG stator winding and convert the AC to DC, the second active rectifier communicatively connected to the direct current link and operative to output DC to the direct current link.

20 Claims, 3 Drawing Sheets

(56) References Cited

U.S. PATENT DOCUMENTS

| | | | |
|---|---|---|---|
| 7,239,036 B2 * | 7/2007 | D'Atre | F03D 7/0272 290/44 |
| 7,321,221 B2 * | 1/2008 | Bucker | H02P 9/007 322/25 |
| 7,372,174 B2 * | 5/2008 | Jones | H02P 9/102 290/43 |
| 7,391,126 B2 * | 6/2008 | Liu | F03D 7/00 290/44 |
| 7,400,117 B1 * | 7/2008 | Rozman | H02P 9/10 322/45 |
| 7,411,309 B2 * | 8/2008 | Hudson | F03D 7/0272 290/44 |
| 7,471,007 B2 * | 12/2008 | Bucker | H02P 9/007 290/44 |
| 7,511,385 B2 * | 3/2009 | Jones | H02M 5/4585 290/43 |
| 7,521,906 B2 * | 4/2009 | Rozman | H02P 9/10 322/24 |
| 7,579,702 B2 * | 8/2009 | Park | H02J 3/386 290/44 |
| 7,605,487 B2 * | 10/2009 | Barton | H02J 3/1892 290/28 |
| 7,622,815 B2 * | 11/2009 | Rivas | H02P 9/102 290/44 |
| 7,652,387 B2 * | 1/2010 | Corcelles Pereira | H02J 3/18 290/44 |
| 7,656,052 B2 * | 2/2010 | Jones | H02M 5/4585 290/43 |
| 7,692,321 B2 * | 4/2010 | Jones | H02M 5/4585 290/43 |
| 7,755,209 B2 * | 7/2010 | Jones | H02M 5/4585 290/44 |
| 7,852,049 B2 | 12/2010 | Maddali et al. | |
| 7,859,231 B2 | 12/2010 | Gieras et al. | |
| 8,013,461 B2 * | 9/2011 | Delmerico | H02M 5/4585 290/44 |
| 8,018,083 B2 * | 9/2011 | Larsen | H02J 3/36 290/44 |
| 8,093,740 B2 * | 1/2012 | Oohara | F03D 7/0224 290/44 |
| 8,093,741 B2 * | 1/2012 | Ritter | H02J 3/386 290/44 |
| 8,115,444 B2 | 2/2012 | De et al. | |
| 8,258,642 B2 * | 9/2012 | Koerber | F03D 7/0284 290/44 |
| 8,264,094 B2 * | 9/2012 | Rivas | F03D 7/0224 290/44 |
| 8,264,209 B2 * | 9/2012 | Kretschmann | H02P 9/007 290/40 C |
| RE43,698 E * | 10/2012 | Hudson | F03D 7/0272 290/44 |
| 8,415,818 B2 * | 4/2013 | Engelhardt | F03D 7/0272 290/44 |
| 8,541,898 B2 * | 9/2013 | Acedo Sanchez | H02P 9/006 290/44 |
| 9,391,554 B2 * | 7/2016 | Li | H02P 9/48 |
| 2003/0151259 A1 * | 8/2003 | Feddersen | F03D 7/0224 290/44 |
| 2004/0217594 A1 * | 11/2004 | Feddersen | F03D 7/0224 290/44 |
| 2004/0217595 A1 * | 11/2004 | Feddersen | F03D 7/0224 290/44 |
| 2004/0222642 A1 * | 11/2004 | Siebenthaler | F03D 7/0224 290/44 |
| 2006/0163881 A1 * | 7/2006 | Bucker | H02P 9/007 290/44 |
| 2006/0192390 A1 * | 8/2006 | Juanarena Saragueta | F03D 9/002 290/44 |
| 2006/0238929 A1 * | 10/2006 | Nielsen | F03D 9/003 361/20 |
| 2009/0009146 A1 * | 1/2009 | Rozman | H02P 29/027 322/27 |
| 2009/0278351 A1 * | 11/2009 | Rivas | F03D 7/0224 290/44 |
| 2011/0057444 A1 * | 3/2011 | Dai | H02J 3/386 290/44 |
| 2011/0141773 A1 * | 6/2011 | Larsen | H02J 3/36 363/35 |
| 2014/0375232 A1 * | 12/2014 | Findeisen | B60L 11/1803 318/139 |
| 2015/0145461 A1 | 5/2015 | Rozman et al. | |

\* cited by examiner

# FAULT TOLERANT ELECTRIC POWER GENERATING SYSTEM

TECHNICAL FIELD

The present disclosure relates to an electric power generating system (EPGS), and particularly to a fault tolerant EPGS for a vehicle.

BACKGROUND

Typical EPGS for ground vehicles include a wound field synchronous or permanent magnet generator coupled to an active rectifier to produce direct current (DC) power. A pulse width modulated (PWM) active rectifier usually includes input and output filters to meet electromagnetic interference (EMI) standards. The EMI filters include both common-mode and differential-mode filters.

SUMMARY

According to one embodiment, an electrical power generating system comprises a first permanent magnetic generator (PMG) stator winding of a generator machine, a first active rectifier communicatively connected to the first PMG stator winding, the first active rectifier operative to receive alternating current (AC) from the first PMG stator winding and convert the AC to direct current (DC), a direct current link communicatively connected to the first active rectifier, wherein the first active rectifier is operative to output the DC to the direct current link, a second PMG stator winding of the generator machine, and a second active rectifier communicatively connected to the second PMG stator winding, the second active rectifier operative to receive AC from the second PMG stator winding and convert the AC to DC, the second active rectifier communicatively connected to the direct current link and operative to output DC to the direct current link.

According to another embodiment, an electrical power generating system comprises a first PMG winding of a generator machine, a first active rectifier communicatively connected to the first PMG winding, the first active rectifier operative to receive alternating current (AC) from the first PMG winding and convert the AC to direct current (DC), a direct current link communicatively connected to the first active rectifier, wherein the first active rectifier is operative to output the DC to the direct current link, a second PMG winding of the generator machine, a second active rectifier communicatively connected to the second PMG winding, the second active rectifier operative to receive AC from the second PMG winding and convert the AC to DC, the second active rectifier communicatively connected to the direct current link and operative to output DC to the direct current link, a load management controller operative to control the first active rectifier and the second active rectifier, and a first PMG control coil communicatively connected to the load management controller that is operative to control DC current output by the first winding.

BRIEF DESCRIPTION OF THE DRAWINGS

Exemplary embodiments and features of the present disclosure will now be described by way of example only, and with reference to FIGS. 1 to 3, of which.

DETAILED DESCRIPTION

The exemplary embodiments described herein include an electric power generating system (EPGS) for a vehicle with improved fault tolerance and power management features and potentially reduced weight and volume.

Figure 1:
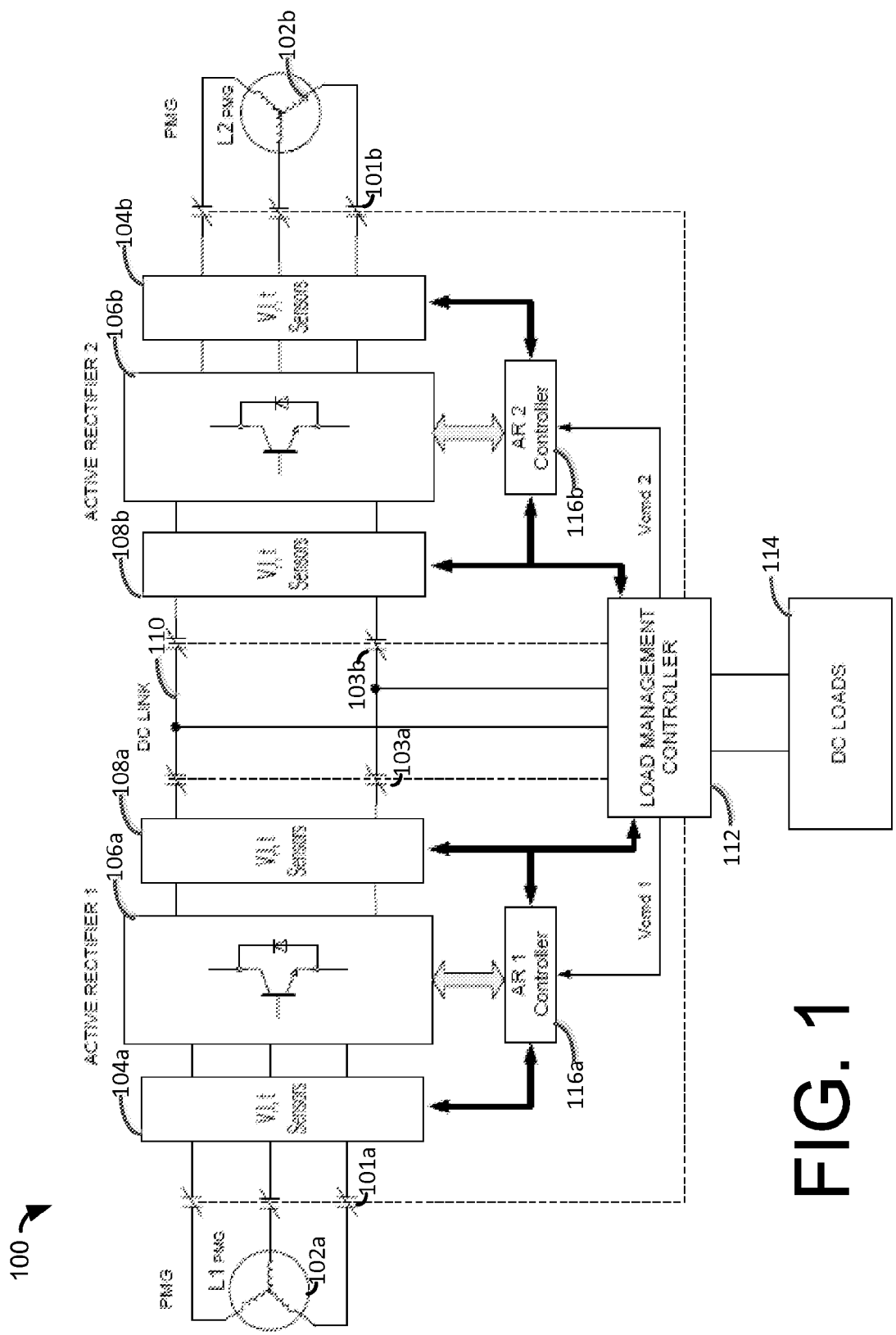
FIG. 1 illustrates an exemplary embodiment of an electric power generating system.

FIG. 1 illustrates an exemplary embodiment of an electric power generating system 100. The system 100 includes a first permanent magnet generator (PMG) that comprises permanent magnets mounted on the rotating shaft driven by the prime mover, such as a gas turbine engine or an internal combustion engine, and stator armature windings 102a; and a second PMG with rotating permanent magnets and stationary windings 102b. Both PMGs may share a common housing of a generator machine. In the illustrated embodiment the PMGs are mounted co-axially on a single generator machine shaft (not shown).

The windings 102a and 102b are monitored by sensors 104a and 104b respectively that monitor the output voltage (V), current (i), and temperature (t) from the respective windings 102a and 102b. A first active rectifier 106a is communicatively connected to the first winding 102a, and a second active rectifier 106b is communicatively connected to the second winding 102b. A second set of sensors 108a and 108b are arranged to monitor the output voltage, current, and temperature of the first active rectifier 106a and the second active rectifier 106b respectively. A direct current (DC) link 110 is communicatively connected to first active rectifier 106a and the second active rectifier 106b to receive the output DC power from the first active rectifier 106a and the second active rectifier 106b. The carrier signals of the first active rectifier 106a and the second active rectifier 106b are shifted by 180 electrical degrees with respect to each other. This shift improves the common mode rejection properties of the system 100 and leads to considerable reduction of the weight and volume of the EMI filters.

A load management controller 112 includes a processor or logic circuit that is communicatively connected to the DC link 110 and to DC loads 114. The DC loads may include any device in the vehicle that is operative to receive DC power. A first active rectifier controller 116a includes a processor or logic circuit that is communicatively connected to the sensors 104a and 108a, the first active rectifier 106a, and the load management controller 112. A second active rectifier controller 116b includes a processor or logic circuit is communicatively connected to the sensors 104b and 108b, the first active rectifier 106b, and the load management controller 112.

In operation, the first winding 102a outputs alternating current (AC) to the first active rectifier 106a. The first active rectifier 106a rectifies the AC current to DC current and outputs DC power to the DC link 110. The load management controller 112 monitors the total DC loads 114 and receives signals from the sensors 108a that indicate the voltage, current, and temperature output from the first active rectifier 106a. The first active rectifier controller 116a receives signals from the sensors 104a that indicate the voltage, current, and temperature output by the first windings 102a and signals from the sensors 108a that indicate the voltage, current, and temperature output by the first active rectifier 106a.

In a similar fashion, the second winding 102b outputs alternating current (AC) to the second active rectifier 106b. The second active rectifier 106b rectifies the AC current to DC current and outputs DC power to the DC link 110. The load management controller 112 receives signals from the sensors 108b that indicate the voltage, current, and temperature output from the second active rectifier 106b. The second active rectifier controller 116b receives signals from the sensors 104b that indicate the voltage, current, and temperature output by the second windings 102b and signals from the sensors 108b that indicate the voltage, current, and temperature output by the second active rectifier 106b.

The load management controller monitors the load on each of the active rectifiers 106a and 106b and outputs control signals Vcmd1 and Vcmd1 to the first active rectifier controller 116a and the second active rectifier controller 116b respectively. The control signals output by the load management controller 112 to the active rectifier controllers 116a and 116b are operative to ensure that the DC load is equally shared between both active rectifier-based power systems (active rectifier and PMG). In the illustrated exemplary embodiment, the first active rectifier 106a may be isolated from the first windings 102a by switches or breakers 101a that are arranged to electrically connect or disconnect the electrical connection between the first windings 102a and the first active rectifier 106a. The first active rectifier 106a may be isolated from the DC link 110 by switches or breakers 103a that are arranged to electrically connect or disconnect the electrical connection between the first active rectifier 106a and the DC link 110. The switches 101a and 103a may be controlled and/or monitored by the load management controller 112.

Similarly, the second active rectifier 106b may be isolated from the second windings 102b by switches or breakers 101b that are arranged to electrically connect or disconnect the electrical connection between the second windings 102b and the second active rectifier 106b. The second active rectifier 106b may be isolated from the DC link 110 by switches or breakers 103b that are arranged to electrically connect or disconnect the electrical connection between the second active rectifier 106b and the DC link 110. The switches 101b and 103b may be controlled and/or monitored by the load management controller 112.

The system 100 offers fault tolerance over systems that use a single PMG armature and active rectifier arrangement in that the states of the switches 101 and 103 may be changed to isolate faulty components in the system, while still providing DC power to the DC loads 114 via the DC link 110. For example, if the windings 102a are degraded, the windings 102a may be electrically isolated from the system by opening the switches 101a, as well as 103a to electrically isolate all active rectifiers—PMG channels from the DC link 110. If the first active rectifier 106a is degraded, the switches 103a may be opened, as well as 101a to electrically isolate the active rectifier 108a—PMG channel from the DC link 110. Likewise the second windings 102b and/or the second active rectifier 106b may each be electrically isolated from the DC link 110 by opening the switches 101b and 103b.

In such a situation, the load management controller 112 may increase the output of the active rectifier 106 that is electrically connected to the DC link 110 depending on the operation parameters of the system 100. The DC load 114 may also be reduced by shedding non-vital system loads to reduce the overall DC load 114.

Figure 2:
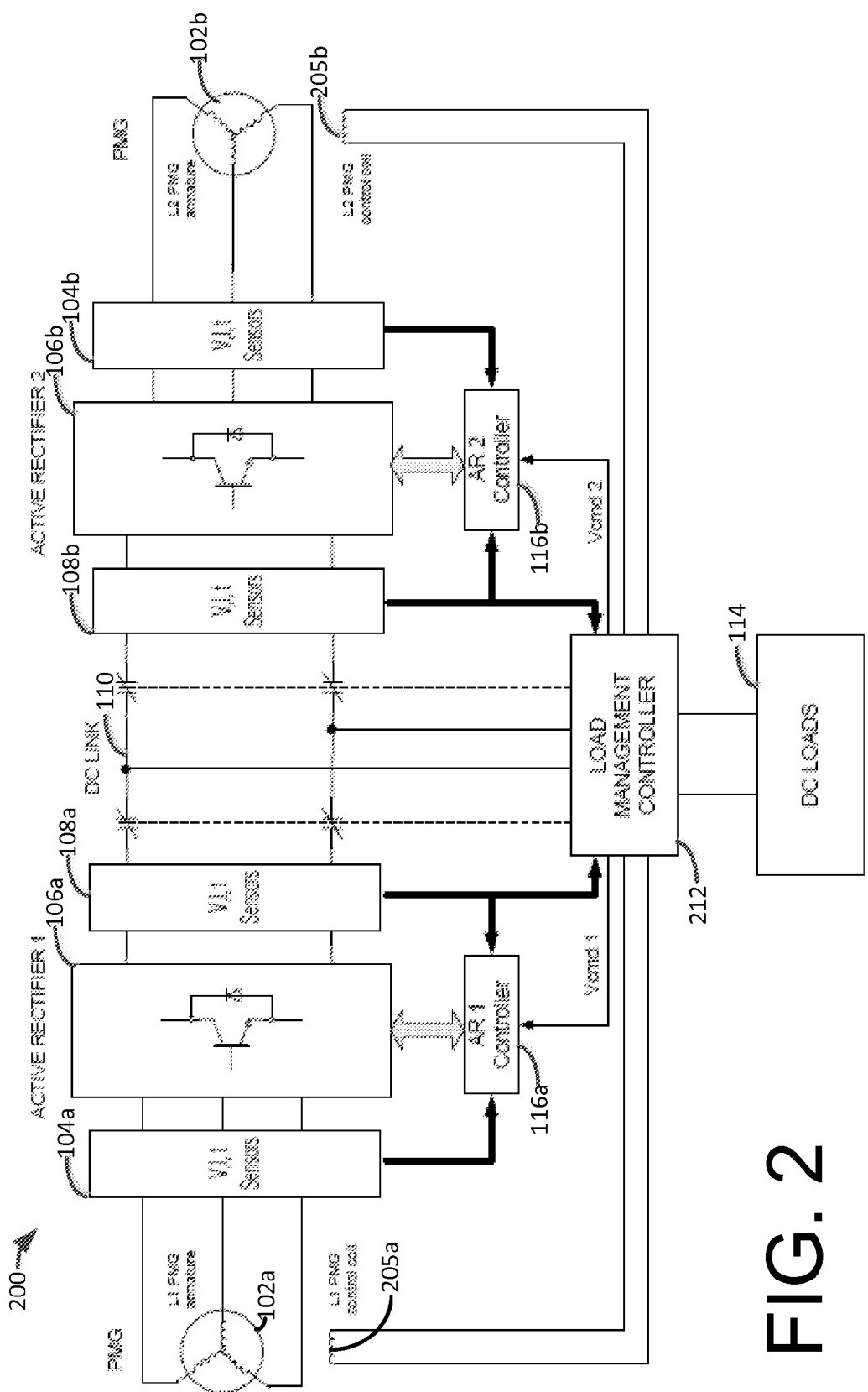
FIG. 2 illustrates an exemplary alternate embodiment of an electric power generating system.

FIG. 2 illustrates an exemplary alternate embodiment of an electric power generating system 200. The system 200 is similar to the system 100 (of FIG. 1) described above, however the system 200 includes a flux regulated permanent magnet generator (PMG) with control coils 205a and 205b that control the AC power at the terminals of the windings 102a and 102b respectively. The load management controller 212 is similar in operation to the load management controller 112 (of FIG. 1), however, the load management controller 212 is communicatively connected to the control coils 205a and 205b and is further operative to control the current in the control coils 205a and 205b, which controls the AC power output of the terminals of the windings 102a and 102b respectively. In operation, if the load management controller 212 sufficiently reduces the current in the control coils 205, armatures 102 may reduce outputting power to the active rectifiers 106. For example, if the load management controller 212 sufficiently reduces the current in the control coil 205a, the first PMG with windings 102a reduces the output power to the first active rectifier 106a, which effectively disconnects power transfer from the first PMG with windings 102a to the first active rectifier 106a and the DC link 110. Since the load management controller 212 may effectively disconnect power transfer from the PMG with the windings 102 to the active rectifiers 106 in the system 200, the system 200 in the illustrated embodiment does not include the switches 101 (of FIG. 1) in the system 100 arranged between the windings 102 and the active rectifiers 106.

Figure 3:
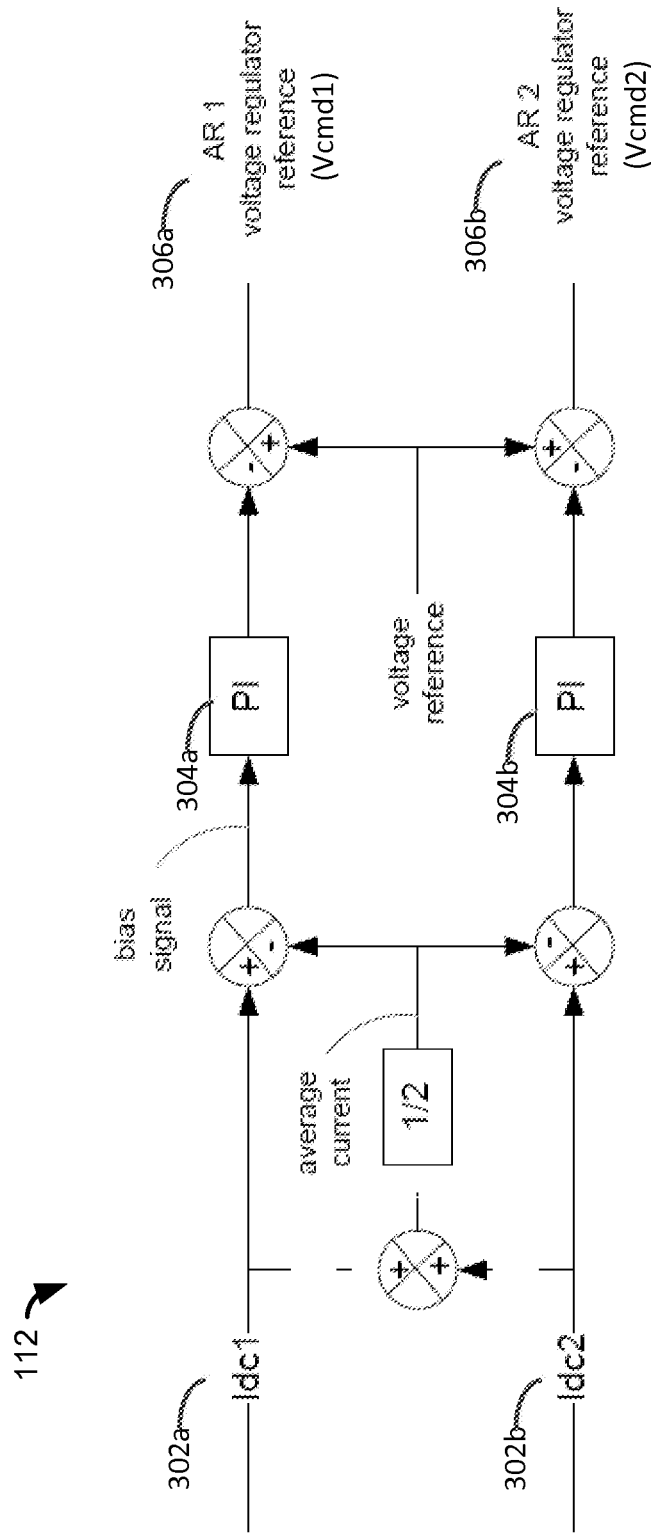
FIG. 3 illustrates a block diagram of an example of the logic used in an exemplary load management controller.

FIG. 3 illustrates a block diagram of an example of the logic used in an exemplary load management controller 112 (of FIG. 1). In this regard, the load management controller 112 receives signals Idc1 302a and Idc2 302b that indicate the sensed DC current output from the first active rectifier 106a and the second active rectifier 106b respectfully. The load management controller 112 averages the Idc1 and Idc2 currents and biases the Idc1 and Idc2 signals 302a and 302b. The biased signals are received by proportional integral controllers 304a and 304b and summed with a voltage reference. The resultant output is a voltage regulator reference voltage 306a and 306b that is output to the first active rectifier controller 116a and second active rectifier controller 116b (of FIG. 1) respectively. The first active rectifier controller 116a and the second active rectifier controller 116b use the voltage regulator reference voltages 306a and 306b to control the DC power output by the active rectifiers 106 to the DC link 110.

Although the figures and the accompanying description describe particular embodiments, it is to be understood that the scope of this disclosure is not to be limited to such specific embodiments, and is, instead, to be determined by the scope of the following claims.

What is claimed is:

1. An electrical power generating system comprising:
   a first permanent magnetic generator (PMG) stator winding of a generator machine;
   a first active rectifier communicatively connected to the first PMG stator winding, the first active rectifier operative to receive alternating current (AC) from the first PMG stator winding and convert the AC to direct current (DC);
   a direct current link communicatively connected to the first active rectifier, wherein the first active rectifier is operative to output the DC to the direct current link;
   a second PMG stator winding of the generator machine; and
   a second active rectifier communicatively connected to the second PMG stator winding, the second active rectifier operative to receive AC from the second PMG stator winding and convert the AC to DC, the second active rectifier communicatively connected to the direct current link and operative to output DC to the direct current link.

2. The system of claim 1, further comprising a first active rectifier controller operative to control the output of the first active rectifier.

3. The system of claim 1, further comprising a second active rectifier controller operative to control the output of the second active rectifier.

4. The system of claim 1, further comprising a load management controller operative to control the first active rectifier and the second active rectifier.

5. The system of claim 1, further comprising:
a first active rectifier controller operative to control the output of the first active rectifier; and
a second active rectifier controller operative to control the output of the second active rectifier.

6. The system of claim 5, further comprising a load management controller operative to send control signals to the first active rectifier controller and the second active rectifier controller.

7. The system of claim 1, further comprising a first switch disposed between a communicative connection between the first PMG stator winding and the first active rectifier; and a second switch disposed between a communicative connection between the second PMG stator winding and the second active rectifier.

8. The system of claim 4, further comprising a control coil communicatively connected to the load management controller that is operative to control DC current output from the first PMG.

9. The system of claim 4, further comprising a control coil communicatively connected to the load management controller that is operative to control DC current output from the second PMG.

10. The system of claim 1, further comprising a switch disposed between a communicative connection between the first active rectifier and the DC link.

11. The system of claim 1, wherein the system is arranged in a vehicle.

12. The system of claim 1, wherein a carrier signal of the first active rectifier and a carrier signal of the second active rectifier are shifted electrically 180 degrees with respect to each other.

13. An electrical power generating system comprising:
a first PMG winding of a generator machine;
a first active rectifier communicatively connected to the first PMG winding, the first active rectifier operative to receive alternating current (AC) from the first PMG winding and convert the AC to direct current (DC);
a direct current link communicatively connected to the first active rectifier, wherein the first active rectifier is operative to output the DC to the direct current link;
a second PMG winding of the generator machine;
a second active rectifier communicatively connected to the second PMG winding, the second active rectifier operative to receive AC from the second PMG winding and convert the AC to DC, the second active rectifier communicatively connected to the direct current link and operative to output DC to the direct current link;
a load management controller operative to control the first active rectifier and the second active rectifier; and
a first PMG control coil communicatively connected to the load management controller that is operative to control DC current output by the first winding.

14. The system of claim 13, further comprising a second PMG control coil communicatively connected to the load management controller that is operative to control DC current output by the second winding.

15. The system of claim 13, further comprising a first active rectifier controller operative to control the output of the first active rectifier.

16. The system of claim 13, further comprising a second active rectifier controller operative to control the output of the second active rectifier.

17. The system of claim 13, further comprising a switch disposed between a communicative connection between the first active rectifier and the DC link.

18. The system of claim 13, wherein a carrier signal of the first active rectifier and a carrier signal of the second active rectifier are shifted electrically 180 degrees with respect to each other.

19. The system of claim 13, wherein the system is arranged in a vehicle.

20. A method for controlling a system, the method comprising:
controlling a first rectifier that is operative to receive alternating current (AC) power from a first permanent magnetic generator (PMG) and output direct current (DC) power to a DC link;
controlling a second rectifier that is operative to receive AC power from a second PMG and output DC power to the DC link, wherein the controlling the first active rectifier and the second active rectifier includes substantially balancing an electrical load of the first rectifier and the second rectifier.

* * * * *